Patented Dec. 7, 1926.

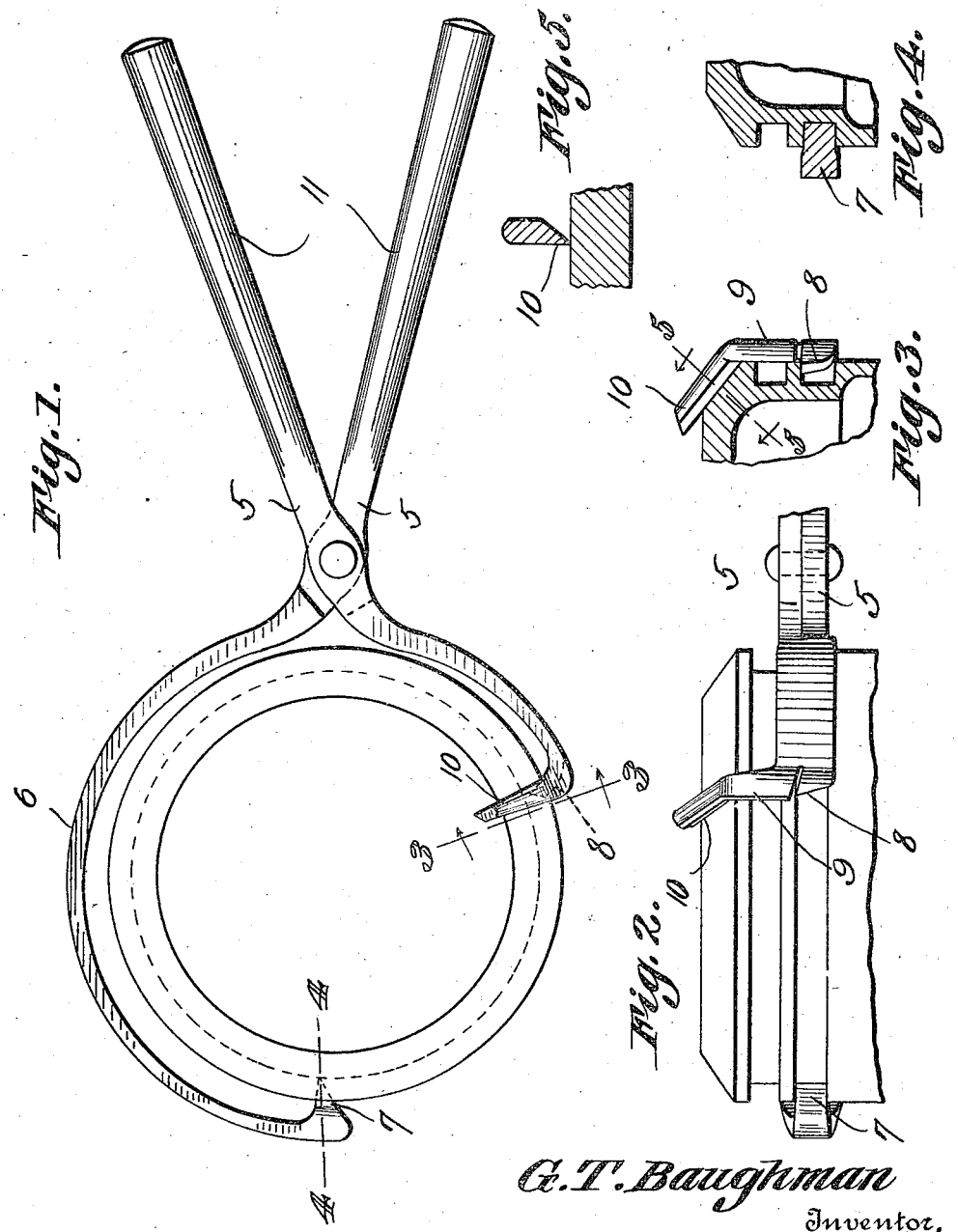

1,609,285

UNITED STATES PATENT OFFICE.

GEORGE T. BAUGHMAN, OF McCORMICK, SOUTH CAROLINA.

CARBON TOOL.

Application filed July 16, 1926. Serial No. 122,884.

This invention embodies a tool designed for use in scraping carbon from the ring grooves, and heads of pistons.

The primary object of the invention is to provide a tool of this character which may be efficiently operated by persons unfamiliar with mechanics, and one wherein the pressure directed to the cutting or scraping elements thereof may be varied at the will of the operator.

With the foregoing and other objects in view which will appear as the description proceeds, the invention resides in the combination and arrangement of parts and in the details of construction hreinafter described and claimed, it being understood that changes in the precise embodiment of the invention herein disclosed, may be made within the scope of what is claimed, without departing from the spirit of the invention.

Referring to the drawings:

Figure 1 is a plan view of the tool, and showing the same as positioned on a piston.

Figure 2 is a side elevational view thereof.

Figure 3 is a sectional view taken on line 3—3 of Figure 1.

Figure 4 is a sectional view taken on line 4—4 of Figure 1.

Figure 5 is a sectional view taken on line 5—5 of Figure 3.

Referring to the drawing in detail, the device includes a pair of pivotally connected sections 5, one of the sections having a substantially long curved portion 6 having an inwardly extended finger 7 at its forward end, the finger 7 being substantially wedge-shaped to fit within a ring groove, for scraping the carbon from the groove and at the same time guide the tool while in use.

The opposite section 5 is comparatively short and is provided with an inwardly extended cutting finger 8 and an upwardly extended portion 9 terminating in an inwardly extended cutting blade 10 especially designed for contacting with the beveled upper edge of a piston as clearly shown by Figure 3 of the drawing to scrape the carbon from that portion of the piston as the tool is being operated.

Handles 11 form a part of the tool and may be gripped by the operator to force the cutting fingers into the ring grooves and into the carbon lodged therein. It will be obvious that by regulating the pressure on the handles, the depth at which the cutting fingers and blades operate, may be regulated to meet various requirements.

It might be further stated that the edges of the cutting fingers are substantially flat or so constructed that they will be guided by their contact with the walls of the ring grooves, and all possibility of the fingers passing from their positions within the ring grooves is eliminated.

In the operation of the device, the tool is positioned over the end of a piston in a manner as shown by Figures 1 and 2, the handle portions being gripped by the operator to cause the fingers to cut into the carbon collected in the ring grooves.

The tool is now reciprocated or rotated around the piston with the result that the blades will cut and scrape the carbon from the piston, leaving the grooves of the piston free of carbon.

I claim:

1. A tool for scraping carbon from piston ring grooves, a pair of pivotally connected sections, each of said sections having a curved end portion, a scraping finger formed at the outer end of each curved portion and adapted to fit in the ring grooves to scrape carbon therefrom, an upwardly and inwardly extended blade formed at one end of one of the curved portions and adapted to overlie the upper edge of a piston to scrape carbon from the upper edge of the piston, and handles for moving the fingers into the ring grooves.

2. A tool for scraping carbon from piston ring grooves, comprising a pair of pivotally connected sections, a finger extending inwardly from one of the sections and adapted to rest in a ring groove, an upwardly and inwardly extended blade on the opposite section adapted to rest on the upper edge of a piston to scrape the carbon therefrom, and handles to be gripped by the operator for forcing the fingers into the ring groove.

In testimony that I claim the foregoing as my own, I have hereto affixed my signature.

GEORGE T. BAUGHMAN.